United States Patent
Vik

[15] 3,680,591
[45] Aug. 1, 1972

[54] UNIQUE HYDRAULIC COUPLER
[72] Inventor: Albam M. Vik, New Brighton, Minn.
[73] Assignee: Dempco, Inc., Minneapolis, Minn.
[22] Filed: May 7, 1970
[21] Appl. No.: 35,444

[52] U.S. Cl. ....137/614.05, 137/614.06, 137/614.11
[51] Int. Cl. ..........................F16l 29/00, F16l 37/28
[58] Field of Search............137/614, 614.02, 614.04, 614.06, 137/614.11, 614.19; 251/148, 89.5

[56] References Cited

UNITED STATES PATENTS

| | | | |
|---|---|---|---|
| 2,625,410 | 1/1953 | Crowley | 137/614.06 |
| 2,675,829 | 4/1954 | Livers | 137/614.06 |
| 3,330,299 | 7/1967 | Slawinski | 137/614.19 |
| 3,301,272 | 1/1967 | Pettyjohn | 137/614.06 |
| 3,130,749 | 4/1964 | Wittren | 137/614 |
| 2,962,303 | 11/1960 | Ramberg | 137/614 |

*Primary Examiner*—Alan Cohan
*Assistant Examiner*—William H. Wright
*Attorney*—Dugger, Peterson, Johnson & Westman

[57] ABSTRACT

A hydraulic coupler for coupling together two hydraulic line portions and which permits quick disconnection of the line portions, has valve means for turning off the flow and preventing loss of fluid from the lines when disconnected, and is made so that connections can be made even though there is pressure present in both of the hydraulic line portions, neither of the hydraulic line portions, or only one of the line hydraulic portions. The coupler is made from a unitary body and other parts that can be manufactured on automatic screw machines and punch presses to insure that the cost of production remains low.

The couplers are made so that the hydraulic circuit in which they are used can be broken merely by rotating a cam for a safety factor to lock out remote implements and hydraulic devices when not in use.

22 Claims, 12 Drawing Figures

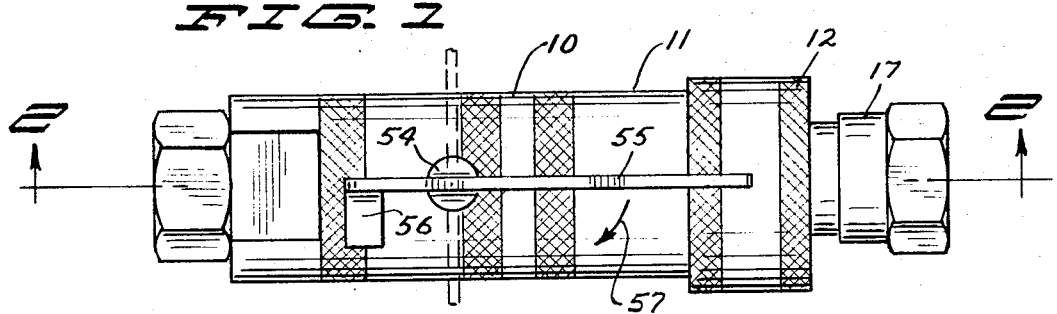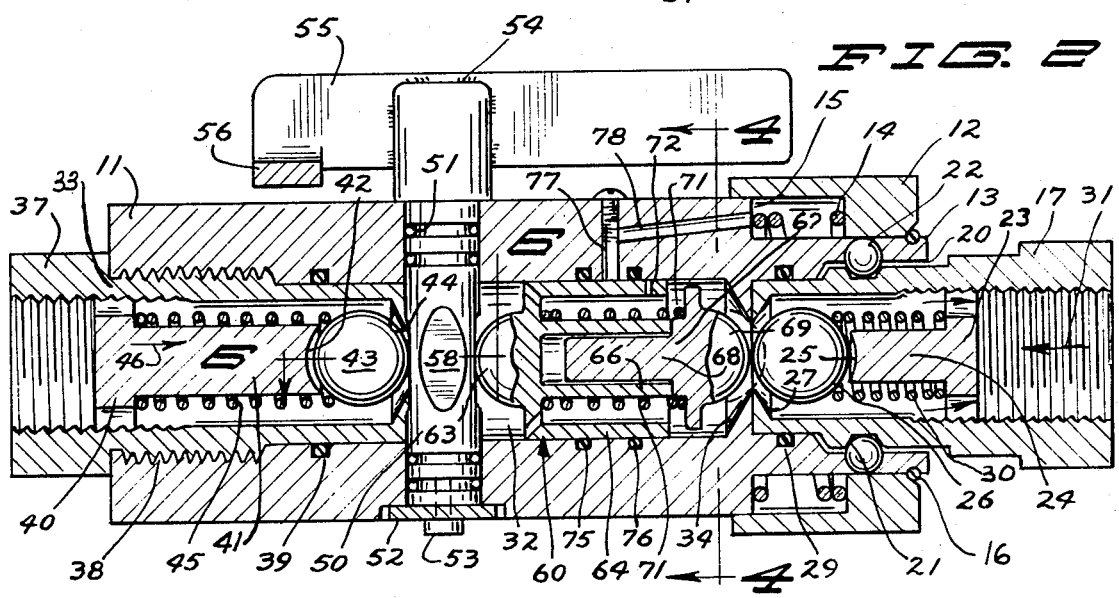

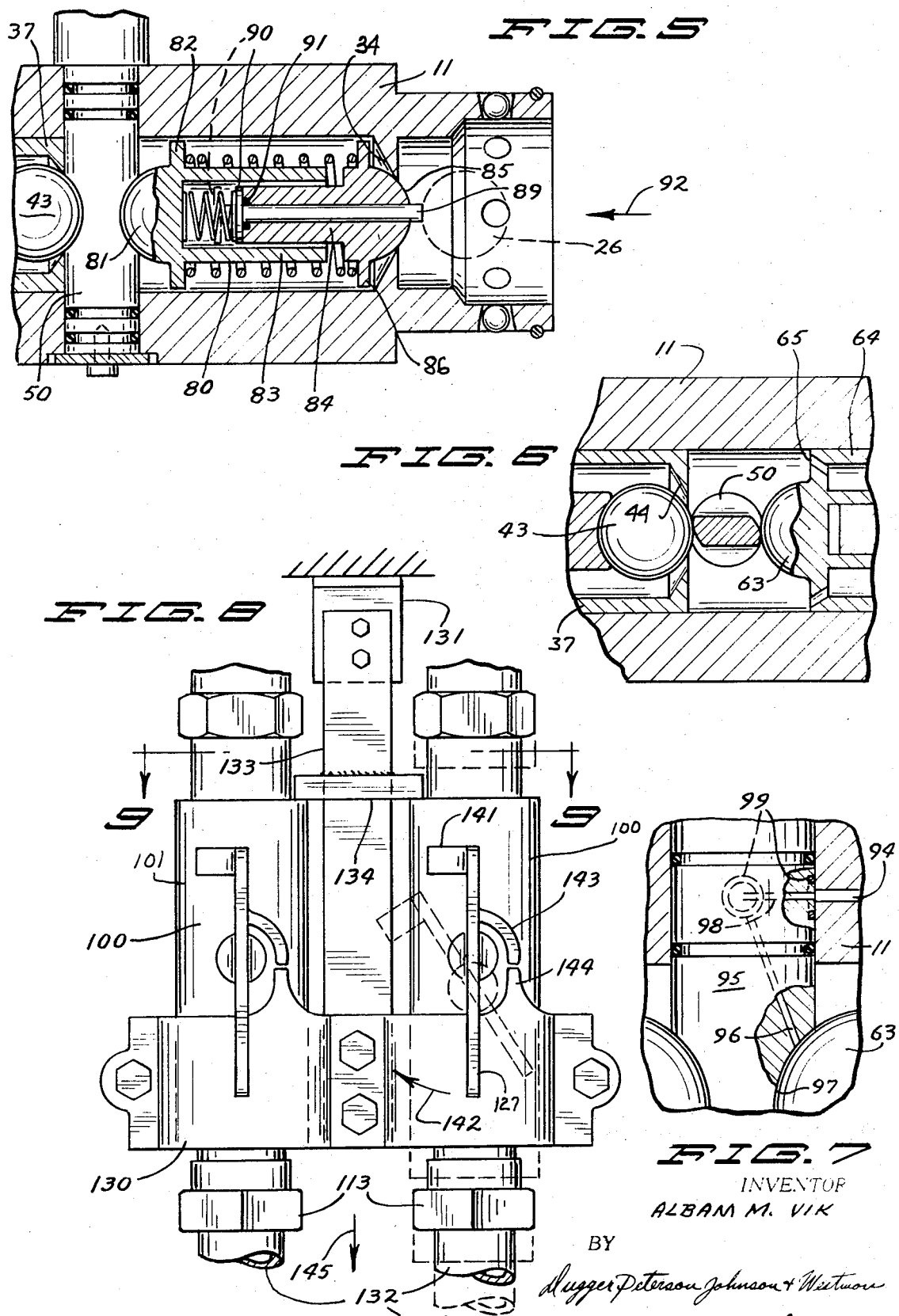

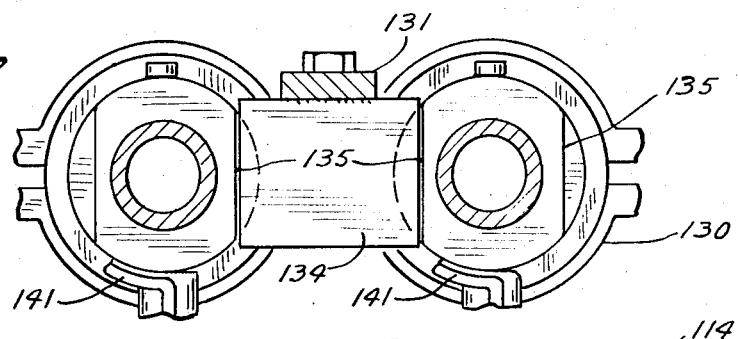
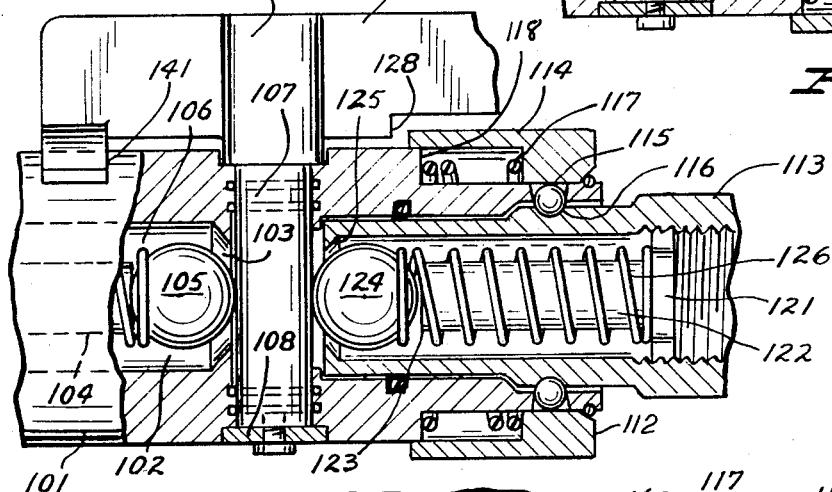
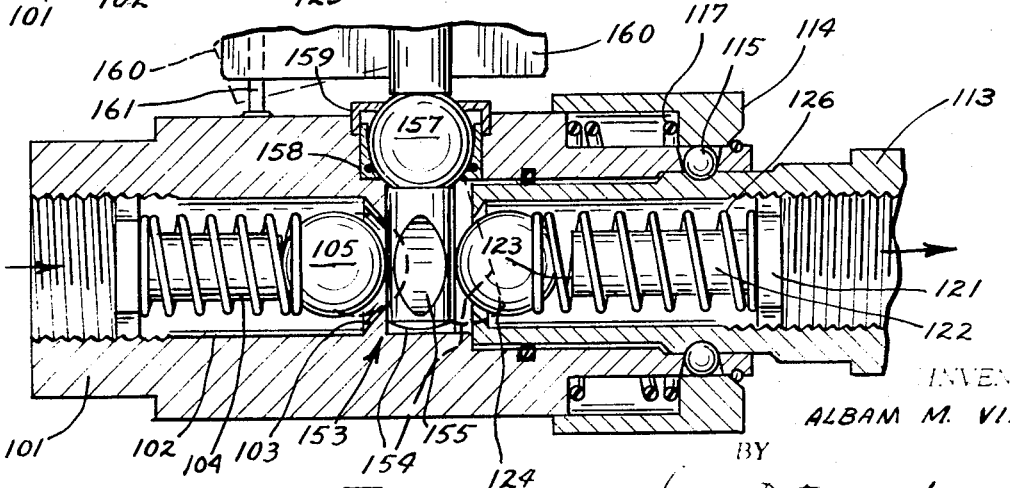

UNIQUE HYDRAULIC COUPLER

BACKGROUND OF THE INVENTION

1. Field of the Invention

The present invention has relation to quick disconnect hydraulic line couplers.

2. Prior Art

Hydraulic couplers in the past have included quick disconnect features, and some have even included shut off valves. For example, U.S. Pat. No. 2,675,829U.S. shows a quick disconnect coupling with a selectively operable valve. This coupling has several disadvantages in operation. First, it is a multipart unit which has several concentric sleeves that have to be closely machined for fitting purposes to avoid leakage. Secondly, the unit cannot be quickly and conveniently recoupled without a large loss of oil if one of the hoses is under pressure. The complex structure required to permit coupling under pressure raises the production cost substantially in U.S. Pat. No. 2,675,829. Other examples of coupling devices that include valves are U.S. Pat. No. 3,129,919 and U.S. Pat. No. 2,625,410.

However, the ability to couple or disconnect under pressure without large losses of oil, the ability to utilize a valve in the coupler for a circuit lock out device, and at the same time keep manufacturing costs down by making the parts simple to machine or form, is missing from the prior art.

SUMMARY OF THE INVENTION

The present invention relates to an automatic quick coupler which will permit the quick connection and disconnection of hydraulic devices. The coupler operates with minimum loss of oil and requires low force to recouple the unit, even when a line is under pressure. The coupler is made with a unitary body that can be made in a screw machine, and incorporates a circuit shut off valve.

In addition, the device of the present invention presents a hydraulic coupler where disconnection can be made with very little loss of hydraulic fluid even if the lines are under pressure.

The present invention utilizes a cam type rotating element for controlling valves so that hydraulic flow in a line can be shut off completely, or opened up. The cam members position the valves positively so that the valves are each spaced equally from their seats to prevent surging of pressure by movement of the valves in either direction during fluid flow. Further, the present invention includes a feature of having an intermediate valve chamber in which a device is positioned which will shut off fluid flow from the source of fluid, and provide for a bleed chamber where a minute volume of oil can be bled out of the unit after the valve has been turned to its off position.

In addition, modifications of the invention relate to a cam shut off valve which cannot be disconnected unless it is in its off position, and a shut off valve which will automatically turn off during an automatic disconnecting cycle. Further, a cam mounted on a ball mounting member is presented which will permit the cam to swivel in place and allow valve shut off. The cams of the present invention are all shaped to provide a torque which tends to rotate the cams to their off position once the cams have started to move to the off position.

It is therefore an object of the present invention to provide an automatic quick coupler for hydraulic lines that includes a shut off valve member.

It is further an object of the present invention to provide an automatic hydraulic coupler that has a unitary body for mounting the cam member that can be made in high production methods.

It is a further object of the present invention to present an automatic hydraulic coupler that will automatically disconnect and can be reconnected even though one of the lines is under pressure, with very little loss of hydraulic fluid.

It is a further object of the present invention to present an automatic hydraulic coupler that is a safety unit for permitting the shutting off of a hydraulic circuit to remote equipment.

It is a further object of the present invention to present a hydraulic coupler having a cam member that can be positively locked in an off position when disconnected.

It is a still further object of the present invention to present a simply made cam member for use with hydraulic couplers to control positioning of valve ball members.

It is another object of the present invention to present a hydraulic coupling device which utilizes check valve balls in coupling nipples that can be positively positioned with respect to their valve seats to insure even flow around the valve seats and prevent surging of the balls.

Other objects will be apparent as the description proceeds.

BRIEF DESCRIPTION OF THE DRAWINGS

FIG. 1 is a top plan view of an automatic coupler made according to the present invention;

FIG. 2 is a sectional view taken as on line 2—2 in FIG. 1;

FIG. 3 is a fragmentary enlarged sectional view of a secondary valve portion of the device of FIG. 1;

FIG. 4 is a sectional view taken as on line 4—4 in FIG. 2;

FIG. 5 is a sectional view taken substantially on the same line as FIG. 3 showing an alternate form of an internal secondary valve;

FIG. 6 is a sectional view taken as on line 6—6 in FIG. 2;

FIG. 7 is a fragmentary sectional view of a cam member and alternate type of bleed passageway used with the device of the present invention;

FIG. 8 is a fragmentary enlarged top plan view of a modified form of the present invention;

FIG. 9 is a sectional view taken as on line 9—9 in FIG. 8;

FIG. 10 is a fragmentary sectional view through a coupler showing a modified cam and coupling arrangement;

FIG. 11 is a view the same as FIG. 9 and showing a dust plug and cam stop in position; and FIG. 12 is a further modified form of a shut off cam which can be utilized with the present invention.

DESCRIPTION OF THE PREFERRED EMBODIMENTS

An automatic coupler for hydraulic line circuits illustrated generally at 10 includes a main outer body 11, and a coupler control sleeve 12 slidably mounted over one end of the outer body over a reduced outer diameter end portion 13 of the main body. The coupler sleeve has an end shoulder retaining a spring 14 that also acts against a shoulder 15 at the end of the outer body to urge the coupler sleeve outwardly against a snap ring 16 positioned in the groove at the outer end of the reduced diameter end portion 13. The interior of end portion 13 of body 11 provides a receptacle 20 for coupler nipple 17 that is in turn threaded internally for attachment to a remote hydraulic hose leading to an implement or the like. The nipple 17, as shown, has an outer configuration to fit within an inner receptacle 20 in the end portion 13, and has an annular groove 21 that is of size to partially receive a plurality of locking balls 22 that are positioned in part spherical openings defined in the outer wall of end portion 13. The sleeve 12 keeps the locking balls 22 positioned inwardly when the sleeve is in its position as shown in FIG. 2 to hold the nipple 17 in place in the receptacle 20. An O-ring 29 positioned in an interior groove seals against the exterior of the nipple 17 to keep it from leaking. The sleeve 12 can be moved against the spring force 14 in direction toward shoulder 15 so that the end portion of the sleeve, which is beveled as shown and rests against the snap ring 13, overlies the balls. This will permit the balls 22 to move outwardly in their part spherical openings to release the nipple 17 and permit it to be disconnected from the main body portion.

On the interior of the nipple, a spring retainer 23 is threadably mounted, and includes a stud 24 that has a part spherical ball seat shown at 25 at the outer end thereof. A check ball valve 26 is mounted between a valve seat surface 27 defined at the interior end of nipple 17 and the stud 24 on the retainer 23. A spring 30 is mounted over the stud 24 and acts against the ball 26, urging it in direction as indicated by the arrow 31.

The retainer 23 is made so that it has passageways or relief areas defined around the periphery thereof so that hydraulic oil can flow past it shown by the arrows in FIG. 2 from the direction of the seat 27 toward the outer end of the nipple 17.

The main body 11, as shown, has a through bore 32 leading from the inlet end 33 opposite from end 13. The through bore 32 comes all of the way from the inlet end 33 and ends in an interior valve seat surface 34. The valve seat 34 is positioned closely adjacent the end of the nipple 17, as shown, when the nipple 17 is in position in its receptacle 20.

A base end nipple 37 is threadably mounted as at 38 on internal threads formed in the bore 32, and is sealed with suitable O rings 39 at its inner end. The nipple 37 includes a valve ball retainer 40 on the interior thereof, and the retainer 40 is threaded on the interior of the nipple and is provided with passageways to permit fluid to flow along the outer periphery thereof as indicated by arrows. The internal threads in nipple 37 also are used for attaching remote hydraulic lines.

The retainer 40 has an inwardly extending stud 41 that is provided with a part spherical end ball seat 42 at the outer end thereof, and a ball valve 43 is positioned between this seat 42 and an end valve seat surface 44 defined in the nipple 37 on the interior thereof.

A spring 45 acts on the ball 43 and surrounds the stud 41 to urge the ball in direction as indicated by arrow 46 to mate with the seat 44.

The position of the ball 43 with respect to its seat 44, when the nipple 37 is threaded into the base end of the housing 11, is controlled by a cross bore cam shaft 50. The cross bore cam shaft 50 is a cylindrical shaft that extends across the main bore 32 and is mounted in suitable openings in the body 11. The cam 50 has O-ring seals 51 at both ends thereof, and is retained in place with a washer 52 fitting into a recess on one side of the housing 11, and with a cap screw 53 so that the cam 50 can be rotated about its axis in openings as it extends across the main body.

The cam 50 is also held in place by an enlarged head 54 that is integral with the cam, and mounts a control lever or handle 55. The control handle 55 as shown, has a stop dog 56, which is part cylindrical and which engages the outer surface of the body 11 to prevent the handle from being rotated in direction as indicated by the arrow 57 beyond its position shown in FIG. 1.

The cam shaft 50 as shown, includes a pair of cam pockets or recesses indicated at 58 and 59 in FIG. 3, respectively, and of course opposite high points positioned at 90° to these recesses as shown in FIG. 2. The cam shaft is shown in its "on" or open position in FIG. 2, with the ball valve 43 resting against the surface of the cam. The "off" or closed position of the cam is shown in FIG. 3 with the ball valve 43 resting on the low point 59 of the cam shaft 50.

The cam further controls movement of an intermediate or secondary valve assembly indicated generally at 60 which is positioned on the interior of the bore 32 between the seat 34 formed in the bore and the opposite side of the cam from the nipple 37. The intermediate valve, as shown in FIG. 2, includes two members. A half ball (hemispherical) cam follower member 63 which acts against the cam 50 is mounted on an end of a tubular outer sleeve 64. The outer sleeve 64 includes an end wall member on which the cam follower 63 is mounted. A plurality of openings 65 are defined in the end wall member of the outer sleeve 64 so that fluid can flow from adjacent the cam follower 63 through these openings 65 onto the interior of the outer sleeve. The outer sleeve 64 surrounds an inner guide sleeve 66 that is formed in the member. The inner guide sleeve 66 in turn slidably mounts a control member 67 that includes a shank 68 slidably mounted inside the sleeve 66. The control member 67 includes a half ball valve member 69 facing and mating with the seat 34. The half ball valve member also has integral tabs 70 that are made to guide against the inner surface of the bore 32 to keep the half ball valve member 69 properly positioned.

The half ball valve member 69 has a hemispherical surface that will seat against the valve seat 34 when it is in a sealing position, and the nipple 17 is not in place. The position of the valve member 69 is determined in part by a spring 71 which surrounds the inner sleeve 66 of the cam follower member 63 and which urges against the back side of the half ball member 69 to urge it toward the seat 34.

On the interior of the bore, a pair of O-rings 75 and 76 are mounted in provided grooves in the bore 32 and are positioned on opposite sides of a passageway 77 that is open to the bore 32. A cross passageway 78 connects with the passageway 77, and opens to the shoulder 15. These passageways 77 and 78 are used for relieving pressure in the chamber area which is formed between the end of the nipple 37 and the valve seat 34, when the ball 43 seals off the nipple 37.

It should be noted that the spring 71 is not as heavy as the spring 30, so that when the sleeve 66 moves away from an abutment shoulder 79 on the valve member 69, the spring 30 will cause the ball 26 to move against its seat 27 to overcome the action of the spring 71. The outer sleeve 64 is of sufficient length to support the unit without binding even when the cam is operating.

The full operating condition of the coupler of the present embodiment is shown in FIG. 2. There, the cam shaft 50 is rotated to position with the handle as shown in FIG. 1. The ball valve 43, and half ball valve member 63 are on the "high" points of the cam shaft 50. In FIG. 6, the open position of the cam in respect to the valve members is shown. The high cam surfaces actually go slightly overcenter with the part spherical surfaces on the follower member 63 and ball 43 which is a valve and cam follower. When the cam shaft is in this position, the ball 43 is away from its seat 44 and closely adjacent the seat 42. The ball 43 is moved against the action of the spring 45 so that fluid coming from the source, which is in the direction from the nipple 37, will flow around the ball 43 and seat 44, and around the cam member 50, through the openings 65, and into the chamber between the outer sleeve 64 and sleeve 66.

It should be noted that the end of sleeve 66 will be abutting against the shoulder 79 and will force the half ball valve member 69 to position as shown in FIG. 2, which is spaced from the seat 34. The outer end portion of the valve member 69 is substantially aligned with the dividing line between the end of the nipple 17 and the edge of the opening defined by seat 34.

Assuming that the nipple 17 is held in place by the balls 22 as shown in FIG. 2, the part spherical ball valve member 69 will move the ball 26 away from seat surface 27 against the action of the spring 30 to position the ball 26 very closely adjacent the seat 25 on the stud 24. Thus, there is a fluid passageway from the nipple 37, past the ball valve 43, and the openings 65, between spaced tabs 70 and past seat surfaces 34 and 27 and then out through the remote end of the nipple 17 to the remote unit or implement that is to receive fluid under pressure.

If it is desired to close off the system, the lever or handle 55 is rotated in direction opposite from that indicated by the arrow 57 to a position substantially 90° from the initial position, and indicated generally in dotted lines in FIG. 1. This movement will position the cam as shown in FIG. 3 so that the low points 59 and 58 align with their respective ball valve members, namely the ball 43 and the hemispherical cam follower 63. It should be noted that in the open position of the cam, the skirt 64 extends far enough out so that a small provided orifice 72 is beyond the outer O-ring 76 and the O-rings 75 and 76 seal around this skirt and prevent fluid from flowing through the passageways 77 and 78.

When the cam is moved to its low cam or off position as shown in FIG. 3, the ball 43 will move toward low cam portion 59. The low portion 59 of the cam 50 is made so ball 43 will be permitted to seat against its valve seat surface 44 thereby shutting off any flow at all from the nipple 37 toward the nipple 17. Spring 45 will urge the ball 43 toward this seat 44. The movement of the cam permits the ball 43 to move against its seat. At the same time, the cam follower 63 will be permitted to move into the low cam receptacle 58. The spring 30 acting against ball 26, and against the half ball valve member 69, forming part of the secondary valve assembly 60, will permit the ball 26 to contact its seat 27 thereby sealing off the nipple 17 as well. The spring 30 provides enough force to cause ball 26 to move to its closed position, and will move the entire assembly of the secondary valve 60 so that the cam follower member 63 rests against the low portion 58 of the cam. The spring 30 is, as stated, heavier and delivers more force than spring 71. At this time, the small bleed orifice 72 in skirt 64 will just barely clear the sealing line of O ring 76 sufficiently to provide for a bleed for the secondary valve chamber through the orifice 72 and passageways 77 and 78, to relieve pressure. The nipple 17 can thus be released without any substantial loss of hydraulic oil.

As soon as the nipple 17 is removed, the spring 71 will urge the half ball valve member 69 against its seat 34 on the main body portion to seal the secondary valve chamber as well.

On recoupling, the nipple 17 is merely inserted, after the sleeve 12 has been retracted to permit the lock balls 22 to move radially outwardly, and the unit will go to its position as shown in FIG. 3.

If the nipple 17 has been disconnected while the cam 50 is still in its high cam or on position fluid under pressure is able to flow through nipple 37 and into the valve chamber for intermediate valve 60 as soon as the nipple 17 moves away from its receptacle 20. As the nipple 17 moves away from its seated position, the ball 26 will seat against its seat 27 to prevent escape of oil from the nipple and the valve member 69 will follow release movement of the nipple 17 so that the valve member 69 will seat against its seat 34 and seal off any flow through the unit, even though the cam 50 is in position as shown in FIG. 2. The position shown in dotted lines in FIG. 2 is the cam position for disconnecting under pressure.

When the unit is used with remotely connected implements, the sleeve 12 will be held stationary, and usually the units will be used in pairs as shown in FIG. 8 for example. A clamp member will be used for holding the sleeve 12 in position, and then a force pulling on the nipple 17 if the implement is disconnected, will cause the entire body member 11 to slide against the action of spring 14 until the lock balls 22 can move into the recessed area of the sleeve 12 and release the nipple 17. This is one instance where pressure would still be present on the nipple 17 at the time it is disconnected.

Assuming that the unit has been disconnected under pressure, reconnection can be easily accomplished. With the valve member 69 on its seat 34 there will be fluid under pressure on the entire unit, and the fluid under pressure will still be active, for example, through the nipple 37. Then the cam 50 can be turned to its low cam or off position to shut off flow through the nipple 37 so that the ball 43 will go against its seat 44 to close off this source of pressure.

The spring 71 will cause the cam follower 63 to follow into the low cam area 58, and because the pressure has been closed off from the nipple 37, a small amount of oil may pass out through the passageways 77 and 78 because the small orifice 72 of the skirt 64 will clear the sealing line of O-ring 76. Then the intermediate valve chamber, which is formed between the end of nipple 37 and the seat 34 within the bore 32, will be relieved of pressure and at low pressure. To recouple, the body 11 is moved relative to sleeve 12 against spring 14 so that the lock balls 22 can go outwardly, the nipple 17 is reinserted and the ball 26 will engage the outer end of the valve member 69. The action of the spring 71 will be overcome, and the intermediate valve will move to position as shown in FIG. 3. The relieving of pressure in the interior of the bore 32 through the passageways 77 and 78 will make the coupling very easy.

If it is desired to close off the entire circuit, the cam is merely moved to its position as shown in FIG. 3, and as a safety factor, the flow of oil in either direction will be closed off. This is because the ball 26 will be seated to close off flow in direction from the nipple 17 toward the nipple 37 (reverse flow), and the ball 43 will be against its seat 44 to close off any flow from nipple 37 toward nipple 17.

An alternate form of a bleed passageway is shown in FIG. 5. In this instance, the body 11 and the coupling portion is formed in the same manner as shown in FIGS. 1–4, and the cam is also the same. However, an intermediate valve assembly 80 forming the same type of valve as intermediate valve 60 is positioned in the bore 32. This intermediate valve assembly 80 has a hemispherical cam follower 81 acting against the cam 50. This cam follower 81 in this instance is guided with tabs 82 that are spaced apart just as the tabs 70 on the half ball valve member 69 of the previous form of the invention. The tabs 82 guide the unit for movement in the bore 32, and still permit fluid flow past the cam follower. The valve member 80 includes a sleeve 83 that is attached to the cam follower 81, and this sleeve 83 is used to slidably mount a shank 84 attached to a half ball valve member 85. The valve member 85 also has tabs 86 for guiding it in the bore 32, and this valve member 85 is the same as the valve member 69 in that it will mate against the seat 34 to seal the unit as shown in FIG. 5, with the nipple 17 removed. However, in this form a small plunger 89 is slidably mounted through the center of the shank 84, and the plunger has a head member 90 which abuts against the base end of the shank 84. The plunger 89 is loosely slidable in the shank 84, but is sealed in its solid line position with respect to the passageway in the shank 84 in which it is slidably mounted with an O-ring 91 on the plunger adjacent the head 90. The O-ring 91 seats against an annular shoulder in the end of shank 84 and moves with the plunger. As can be seen, the shank 84 protrudes outwardly beyond the end surface of the half ball member 69 into the cavity for the nipple 17.

If there is pressure in the intermediate valve chamber between the ball 43 on the nipple 37 and the valve seat 34, when it is desired to recouple the nipple 17 this pressure can cause problems if there is not some means for bleeding. As shown in dotted lines, when the ball 26 from the nipple 17 is moved inwardly in directions indicated by the arrow 92 it will contact the end of the plunger 89, and will move the head 90 back to its position as shown in dotted lines in FIG. 5 before the half ball 85 is contacted by the ball 26. This will move the O-ring 91 away from its seat as well, (it stays on the plunger 89 adjacent head 90) and will permit a small amount of oil to bleed in past between shank 84 and the interior of sleeve 83 and then past the plunger 89 and out into the cavity for the nipple 17 along the surface of this plunger. There is a slight amount of clearance around the plunger 89 to provide this bleed for the intermediate valve chamber cavity, and when the head 90 is in its seated position, the O-ring 91 provides a seal to prevent loss of oil. Once the pressure has been relieved in the chamber for the intermediate valve assembly 80, the coupling can easily take place, and the entire unit will be moved to position as shown in FIG. 3 for this coupling action. The only difference here for the intermediate valve is the alternate bleed passage around the plunger 89 that will be contacted by the ball 26 when the unit is assembled.

In both of these forms of the invention, it should be noted that the positioning of the valve members with respect to their seats is mechanically arranged. In FIG. 2, the position of the ball 43 between seats 42 and the cam 50 is fixed and also it should be noted that the intermediate valve 60 is mechanically positioned because the valve member 69 abuts against the sleeve 66 to hold the distance between the seat 34 and the surface of this valve member 69 a fixed amount. The seat 25 on the stud 24 for the ball 26 prevents this ball 26 from moving away from its seat any substantial distance, and thus the spacing between the seat 27 and the ball 26 is controlled because the part spherical valve member 69 cannot move toward the cam from its stopped position. Thus the valves will not move back and forth in changing flows as is common in some hydraulic couplers, and an even flow is maintained.

FIG. 7 shows fragmentarily a further form of bleed arrangement for the intermediate valve chamber. In this form the cam 95 is the same as cam 50 and it operates on the valve members as before. However, instead of having an orifice 72 and the passageway 77 for bleeding the intermediate valve chamber, a passageway 96 is provided at the low cam 97 for the cam follower 63. The passageway 96 connects to a cross passageway 98 which aligns with a passageway 94 when the cam is in its "off" position as shown in FIG. 7. The passageway 94 opens to shoulder 15, just as passageway 78 does.

An O ring 99 is mounted in a groove on the cam 95 and the O-ring surrounds passageway 98 to seal this passage way with respect to the interior surface of the cross bore in which the cam is mounted when the cam 95 is in its off position as shown in solid lines in FIG. 7. The O-ring seals the passageways 98 and 94 in communication with each other. When the cam is in its on position, at 90° to the solid line position of FIG. 7, the O-ring 99 is in its dotted position shown in FIG. 7 and thus will seal against the interior of the bore and prevent any fluid from escaping through passageways 96 and 98. The intermediate valve chamber is therefore sealed. The bleed occurs when the cam is turned off to relieve the pressure in the intermediate chamber. The bleed passageways 94 and 98 are timed so they do not communicate until the valve balls 43 and 26 are fully seated. The volume of oil that actually flows is therefore extremely small.

In FIG. 8, an alternate form of the invention is shown wherein the cam will automatically be turned to its off position when the coupler is automatically disconnected. This feature is particularly important with the embodiment of the invention as shown in FIGS. 10 and 11, but can be used with the first form of the invention if desired.

In FIG. 8, a pair of hydraulic couplers illustrated generally at 100 are shown to be of the form in FIG. 10. Here there are valve bodies 101 which again are formed in a manner that can be made on the screw machine with an interior bore 102 forming a valve seat 103 right in the main housing 101. In this instance, a spring retainer and ball retainer 104 can be mounted right into the interior of the bore 102, without any separate input end nipple. A ball 105 is positioned between the end of this retainer 104 and the seat 103. The ball will move from its position spaced from the seat 103 to a position against the seat 103. The spring 106 is used to urge the ball toward its seat when the low parts of cam 107 are properly positioned. The cam member 107 is formed substantially the same as cam 50, and has high and low points just as cam 50 does. The cam 107 is held in place with a washer 108, acting against the recess on the main body 101, and held in place with a cap screw. The cam is also sealed with O-rings, as shown, and has a head member 109 onto which a control lever is mounted. At the outer end 112 of the body 102, a nipple 113 is mounted in the same manner as the nipple 17 in the previous form of the invention. A retracting sleeve 114 controlling the position of lock balls 115 that go into a groove 116 in the nipple is utilized, and a spring 117 is used for urging the sleeve 114 to its ball holding position as shown in solid lines in FIG. 10. As will be explained, the cam control handle locks the unit against release until the cam has been turned to its off position. The spring 117 acts against a shoulder 118 as in the previous forms of the invention. When the sleeve is retracted against the action of the spring 117, the balls 115 can move out in their provided receptacles clearing the edges of the grooves 116 to permit the nipple 113 to be removed. The nipple 113 includes an interior retainer member 121 which has a stud 122 having an end seat 123. A ball 124 is mounted between this seat 123 and a seat 125 formed on the interior of the nipple 113. A spring 126 is utilized for urging the ball 124 toward its seat 125. The cam 107 controls the position of the ball 124 with respect to its seat 125. In its on position as shown in FIG. 10 in solid lines, the flow is free to go through the coupling because ball 105 is off the seat 103, and the ball 124 is off the seat 125. The unit cannot be uncoupled in this position. A cam handle 127 mounted on the head 109 of the cam as shown in FIG. 10 includes a stop shoulder 128 that is positioned so that when the handle is in its open position, as shown, the shoulder 128 prevents the sleeve 114 from being moved to its release position, and the nipple 113 just plain cannot be removed until the cam is shut off. This prevents the loss of fluid from an accidental disconnection under pressure. When the cam is turned off, the shoulder 128 is rotated away from the sleeve 114, so the sleeve can be retracted to release balls 115 and the nipple.

For automatic or break away operation, the structure shown in FIG. 8 is utilized. Here, the sleeve 114 of both of the couplers 100 are mounted in a bracket 130 which holds the sleeves 114, and the bracket 130 in turn is mounted through a retainer 133 to a fixed member 131 that is stationary with respect to the items that are to be disconnected. The nipples 113, are connected to remote hydraulic hoses 132. The bracket 133 has a stop lug 134 that is positioned between the two couplers 100, and is adjacent flat surfaces 135 formed on the end of bodies 101 (used for wrench surfaces), to prevent the couplers from rotating about their longitudinal axis when they are positioned in this bracket.

The outer housing, therefore, can move with respect to the sleeve and with respect to the brackets to position as shown in dotted lines in FIG. 8 on the righthand one of the couplers.

The cam 107, and the head 109 of this form of the invention have a different handle attached thereto. As shown, the handle 127 has a stem portion above shoulder 128 that comes above the bracket 132. A stop 141 the same as the stop dog 56 of the previous form of the invention prevents the handle from turning too far in direction as indicated by the arrow 142. However, when used with the coupler body 101, it should be remembered that the cam has to be turned off before the unit is disconnected. For automatic disconnect operation, then an actuator lug 143 is utilized on the handle 127 and it is positioned to align with an actuator finger 144 fixed to the brackets 130. This is shown in both the units in FIG. 8. When the force on a hydraulic hose 132, for example, if an implement disconnects, moves the outer body 101, and the nipple 113 in direction as indicated by the arrow 145, the finger 144 engages lug 143 and tends to rotate the lever 127 about the axis of cam 107 in opposite direction from that indicated by the arrow 142. This will rotate the cam member about its axis to the dotted line position shown in FIG. 8, and once it reaches this position, the ramp action of the balls 105 and 124 acting against the surfaces of the cam, which is as shown in FIG. 6, create a torque that snaps the cams further in direction opposite from that indicated by arrow 142 until the unit is completely shut off (the cam rotates 90°). By this time the sleeve 114 will have been moved relative to the body (actually the body 101 is moving because of the force on the nipple 113) so that the balls 115 move back into the recess provided releasing the nipple 113 and permitting it to disconnect. By this time the ball 105 will have reached the seat 103 and sealed off the pressure, the cam will be in its off position, and no hydraulic fluid will be lost.

The body 101 is permitted to slide back and forth relative to the bracket 134 without rotating so that the dog or actuator lug 143 and the finger 144 provide positive actuation when a remote force tends to unhook the coupler.

If desired, the couplers can be held in any rotational position relative to the brackets 143 by making appropriate lugs 134 attached to these brackets. For example, the units could be at 90° to their positions shown in FIG. 9 merely by rotating them to this position and having a bracket forming double U-shaped stops holding on both of the surfaces 135 (which would then be on the top and bottom) on each of the couplers.

When the coupler is disconnected, a solid dust plug illustrated at 149 can be inserted in place of the nipple 113 and held in place with the balls 115 as shown. The dust plug is formed so that it has an outwardly protruding end member 150 which engages the low portion of cam 107 on this side and prevents the cam from being rotated back to its open position. This prevents accidentally turning on the flow of fluid through the coupler. Thus the cam cannot be turned and the coupler opened until the dust or safety plug 149 has been removed. Once the nipple 113 is reinserted, the cam can be manually rotated because of the great mechanical advantage against any pressure coming from the source of fluid under pressure and acting on ball 105.

A further modified cam member is shown in FIG. 12. As shown here, the body 101 is formed just as it is in FIG. 10, and the spring retainer 104, ball 105, seat 103, and all of the rest of the components in the base end of the unit are the same. Likewise, the nipple 113, sleeve 114, control balls 115, and spring 117 operate in the same manner. The nipple 113 again has a sealing ball 124, a seat 123 on the end of a stud 122 which is formed in the retainer 121. The spring 125 is also included. However, the modified cam member 153 includes a cylindrical stud 154 that has low points and high points as before, for example low point 155 shown in FIG. 12, and the high points which are contacting the balls 105 and 124 are shown in FIG. 12. The stud 154 does not extend all of the way across the bore 102 of the main body.

The cam 153 is mounted to have a spherical head 157 that seats in a spherical seat formed in one side of the housing 110, and which is sealed with an O-ring 158. A ball seat retainer nut 159 is attached to hold the ball 157 in position, and a handle 160 is utilized for controlling the position of this cam. It should be noted that the handle is spaced above the housing 101 a substantial distance, and a stop lug 161 is provided for permitting some movement of the handle along the lug, toward and away from the coupler body. The cam construction is to permit automatic closing in the case of disconnection of the nipple 113. In this form, if the nipple 113 is disconnected when the unit is under pressure, the ball 105 will move against the cam 153, and the cam will swing because of this spherical mounting seat to its dotted line position shown in FIG. 12, wherein the ball 105 will seat against its seat 103 and seal off fluid flow. When the nipple is again reinserted, the stud 154 will be moved to its normal position. In normal use, the forces will be balanced on the cam, and if desired spring 125 can be heavier than spring 104 and the seat 123 may be spaced so that it will keep the stud 154 from going toward the nipple 113 to keep the cam in operable position. Thus a spherically seated swinging cam member positioned across the bore of the unitary housing can be used for automatic closing off in the case of disconnection of the disconnecting nipple 113.

The handle 160 can slide up and down along the stop 161 to permit the cocking of the cam 154 for this automatic shut off action.

All of the devices use a main body having a bore with a valve seat formed right in the bore, and the body itself mounting the cam and other operation devices, this makes the unit easy to make on screw machines, reliable in operation, and low cost.

What is claimed is:

1. A hydraulic coupler assembly comprising a main body member, a bore in said main body member, means defining a first valve seat in said bore adjacent one end thereof, said first valve seat having a surface facing toward the inlet of said body, a cam member mounted in said body, an inlet valve device, said cam member being movable from a high cam position wherein said inlet valve device is open to a low cam position to close said inlet valve device, an intermediate valve member in said bore comprising a cam follower member and a first valve member slidably mounted in said bore relative to each other, said cam follower member being positioned in said bore for sliding movement against said cam, and said first valve member being positioned adjacent said first valve seat and movable from an intermediate valve closed position wherein said first valve member engages said first valve seat and closes off flow past said first valve seat, to an intermediate valve open position, bias means urging said first valve member toward the intermediate valve closed position, and means acting between said cam follower member and said first valve member to prevent said first valve member from moving away from said first valve seat more than a predetermined distance when said cam member is in its high cam position.

2. The combination as specified in claim 1 wherein said cam member is operated by an external handle, and stop means cooperating between said external handle and said body member preventing movement of said cam member beyond a predetermined position in a first direction of movement.

3. The combination as specified in claim 1 and bleed passage means leading from said bore and positioned between the inlet valve seat and said first valve seat, means to open said bleed passage means when said cam member is moved to its low cam position and after said inlet valve member has seated against the inlet valve seat, and any flow past said first valve seat has been closed off.

4. The combination as specified in claim 3 wherein said bleed passage means includes a plunger slidably mounted in said first valve member, said plunger being movable from a sealing position to a pressure relief position, said plunger extending in direction to be engaged by an external member tending to move said first valve member to the intermediate valve open position and thereby moving said plunger to said pressure relief position prior to the time said first valve member is moved from its first valve seat.

5. The combination as specified in claim 3 wherein said bleed passage means includes a passage in said cam and open to a low cam portion of said cam, said passage in said cam including sealing means between the cam member and the body, said passageway in said cam being sealed when the cam is in the high cam position and open to atmosphere with said cam in low cam position.

6. The combination as specified in claim 3 wherein said intermediate valve member includes a cylindrical member, a passageway in said body open to said bore and to a low pressure area, and means on said cylindrical member sealing said passageway from communication with said bore when the first valve is open, and opening said bore to said passageway only when the cam moves to its low cam position.

7. A hydraulic coupler assembly comprising a main body member, a bore in said main body member, means defining a first valve seat in said bore adjacent one end thereof, said first valve seat having a surface facing toward the inlet of said body, a nipple member, releasable means to hold said nipple member on said body adjacent said first valve seat and on a side thereof opposite from the inlet, said nipple member having an interior nipple valve seat, a nipple valve member in said nipple, first spring means urging said nipple valve member toward said nipple valve seat, a cam member mounted in said body and extending across said bore, an inlet valve device positioned adjacent said cam member on the inlet side thereof comprising an inlet valve seat facing toward the inlet, and an inlet valve member of size to mate with said inlet valve seat, said cam member being movable from a high cam position wherein it moves said inlet valve member away from the inlet valve seat, to a low cam position wherein said inlet valve member contacts said inlet valve seat and seals off flow from the inlet toward said nipple, an intermediate valve member in said bore comprising a cam follower member and a first valve member slidably mounted relative to each other and facing in opposite directions, said cam follower member being positioned in said bore for sliding movement against said cam, and said first valve member being positioned adjacent said first valve seat and movable from an intermediate valve closed position wherein it engages said first valve seat and closes off flow from the inlet to an intermediate valve open position, second spring means between said cam follower member and said first valve member, said cam follower member and first valve member being in engagement when said cam is in its high cam position to cause said first valve member to act against the nipple valve member to move said nipple valve member away from said nipple valve seat thereby to provide a flow path from the inlet valve member and inlet valve member seat, past the first valve member and past said nipple valve.

8. The combination as specified in claim 7 wherein said intermediate valve member is of size to permit said nipple valve member to move against the nipple valve seat when said cam is moved to its low cam position.

9. The combination as specified in claim 8 wherein said second spring means between said cam follower and said intermediate valve member is of lesser force than the first spring means acting on said nipple valve.

10. The combination as specified in claim 7 and stop means spaced from said inlet valve member and said nipple valve member to prevent the respective valve members from moving away from their respective seats beyond a certain distance.

11. A coupling for hydraulic fluid lines comprising a body, a through bore in said body and having a shoulder defining an inlet end valve seat, a valve member positioned to seal on said valve seat, a cam member having high and low positions mounted in said body member transversely to said bore and controlling movement of said valve member relative to said valve seat, a coupler nipple, releasable means releasably mounting said coupler nipple to the body with a portion of said nipple in said bore, said nipple including an interior nipple valve seat, and a nipple valve capable of closing off fluid flow out of said nipple when said nipple valve engages said nipple valve seat, said means releasably positioning said nipple positioning the nipple valve so as to be contacted by said cam member, and said valve member and nipple valve both being moved away from their respective seats when said cam is in its high cam position, thereby to permit flow from the inlet of said body through said nipple, said cam being movable to a low cam position wherein said valve member is against the valve seat defined in said body, and said nipple valve is against the seat in said nipple thereby to close off fluid flow out of said nipple and from the inlet of said body member to the nipple.

12. The combination of claim 11 and lock means coordinated with movement of said cam between its high and low positions to prevent the releasable means from releasing the nipple when said cam is in its high position.

13. The combination as specified in claim 11 and a dust plug member adapted to be mounted on said body by said releasable means when said nipple is removed, said dust plug including means to lock said cam from movement when said cam is in its low position to prevent movement of said cam to its high position when said dust plug is in place.

14. A fluid line coupling means comprising a main body member having a bore therethrough, a cam member mounted in said body, a normally closed inlet valve device, said cam member being movable from a first position to open said inlet valve device to a second position to permit said inlet valve device to close, an intermediate valve assembly in said bore to receive fluid passing through said inlet valve device, means urging said intermediate valve assembly toward a closed position, and a removable coupler valve assembly mounted on said body member adjacent said intermediate valve assembly to receive fluid from an outlet side of said intermediate valve assembly, means biasing said coupler valve assembly to closed position, means acting between said cam and said intermediate valve assembly to cause portions of said intermediate valve assembly to engage and open said coupler valve assembly when said coupler valve assembly is mounted on said body member with the intermediate valve also held open when the cam is in its first position and permitting said coupler valve assembly to move to closed position when the cam is in its second position.

15. The combination as specified in claim 14 wherein said intermediate valve assembly comprises a valve body and cam follower assembly slidably mounted in said bore, and a valve seat in said main body member, said valve body mating with said valve seat when said intermediate valve assembly is closed, and bleed means to permit relieving pressure in the bore between the inlet valve device and said valve seat when the inlet valve device and intermediate valve assembly are closed.

16. The combination as specified in claim 14 wherein said means acting between said intermediate valve assembly and said cam comprises a cam follower member and a valve body, said means urging said intermediate valve to closed position comprising a spring of less force than the means biasing said coupler valve assembly to closed position acting between said cam follower member and the valve body.

17. A line coupling device for use in a hydraulic circuit comprising a main body member, a bore through said main body member, a valve seat formed by a shoulder in said body and facing in one direction, a valve member mating with said valve seat, a releasable coupler means on the body on the opposite side of said valve seat from said one direction, said releasable coupler means being of size to hold a coupler nipple in position at one end of said main body in communication with the bore, a cam member mounted in said coupling device and movable between valve open and valve closed positions for controlling movement of said valve member with respect to said valve seat in said bore, whereby flow through said bore passed said valve seat to said coupler nipple may be closed off, said cam member comprising a stud extending transversely across said bore, and on a side of said valve seat opposite from the inlet side of said valve seat, and means to mount said stud in said main body member comprising a part spherical ball on said stud and a mating part spherical seat member on one side of said main body member only, the opposite end of said stud from said ball being positioned inside said bore and being free from said body, wherein said stud can pivotally move about its mounting ball relative to said valve seat in direction to permit said valve member to close regardless of cam position when said releasable coupler means is not retaining a coupler nipple.

18. An automatic coupling device for use in a hydraulic circuit comprising a main body member, a bore through said main body member, a valve seat formed by a shoulder in said body and facing in one direction, a valve member mating with said valve seat a releasable coupler means on said main body member on the opposite side of said valve seat from said one direction, one coupler nipple, said releasable coupler means being of size to hold said coupler nipple on said main body member in position communicating with the bore, a cam member mounted in said coupling device and movable between valve open and valve closed positions for controlling movement of said valve member with respect to said valve seat in said bore, whereby flow through said bore in said one direction can be closed off, said through bore and said seat being of size so that said bore and seat may be machined from one end of said main body member, said releasable coupler means comprising a sleeve slidable with respect to said body from a nipple holding to a nipple release position, a handle for said cam member extending to the exterior of said body member, said handle including a shoulder positioned to interfere with movement of said sleeve to its nipple release position when said cam member is in its valve open position to prevent said nipple from being removed from said main body member until said cam member is moved to its valve closed position, means for holding said sleeve with respect to a stationary object, wherein force on a nipple held in said releasable coupler means in direction away from the stationary object will tend to move said body relative to said sleeve, actuating means on said cam operable upon movement of said main body member to turn said cam to its valve closed position to permit said sleeve to move relative to the body to its nipple release position, said valve seat being positioned in said bore adjacent said cam member, a valve spring, said spring urging said valve member toward said valve seat, said cam directly controlling position of said valve member relative said valve seat, said nipple member mounted by said releaseable coupler means including a nipple valve member normally urged to a closed position, and having an actuating portion protruding from said nipple, said releaseable coupler means retaining said nipple on said body adjacent said cam wherein said nipple valve is moved by said cam to an open position when said valve member is moved to a position away from said seat.

19. A fluid line coupling device for use in a hydraulic circuit comprising a main body member, a bore defined through said main body member and having a fluid inlet and a fluid outlet, a fluid inlet valve member, a valve seat formed by a shoulder in said body member, an intermediate valve assembly between said inlet valve member and said valve seat, a cam member mounted on said main body and movable between a valve open position and a valve closed position to open or close said inlet valve member, said intermediate valve assembly including a cam follower and a check valve member slidably mounted with respect to each other, said check valve member mating with said valve seat and being movable toward and away from said valve seat, said cam follower engaging said check valve member to hold said check valve member from moving away from said valve seat more than a preselected amount with said cam in its valve open position, and releaseable means for releasably retaining a hydraulic line coupler nipple valve at the second end of said bore in position wherein a coupler nipple valve retained by said releaseable means will be held open by said intermediate valve assembly, with the check valve member spaced from said valve seat and engaged by the cam follower when the cam is in its valve open position, said intermediate valve assembly being of size to permit a coupler nipple valve retained by said releaseable means to close with the cam in the valve closed position.

20. The device of claim 19 and spring means urging said check valve member toward said valve seat to close off fluid flow regardless of cam position, force from said spring means being overcome by force from a coupler nipple valve held by said releaseable means.

21. The device of claim 19 and means opening a pressure bleed passageway to the bore between said inlet valve member and said valve seat when the cam is in said valve closed position and said check valve member seats on said valve seat.

22. A coupling device for use in joining separable hydraulic lines comprising a main body member, a bore formed through said main body member, a valve seat in said bore, said bore having a first end and a second end, a first hydraulic line connected to a first end of said bore, a first check valve device adjacent the first end of said bore including first valve means urged to close to normally prevent flow from the first line through said bore, a second hydraulic line having a coupler nipple including a nipple check valve on an end thereof, releasable coupler means for retaining said coupler nipple at a second end of said bore, a cam member operably mounted in said bore and including control means external of said main body member and being movable between high cam and low cam positions, an intermediate valve assembly in said bore between said first check valve and said coupler nipple, said intermediate valve assembly comprising first means acted upon by said cam member and second means slidably mounted with respect to said first means in said bore for movement toward and away from said valve seat and forming an intermediate check valve in cooperation with said valve seat, first bias means normally urging said second means toward said valve seat to prevent flow from the first end to the second end of said bore, second bias means of higher force than said bias means urging said nipple check valve to close, said nipple check valve including a portion engaging said second means when said coupler nipple is held on said body, said cam member opening said first check valve in high cam position, said first means and said second means mechanically engaging when the cam is in high cam position and forcing said nipple check valve open against the force of the second bias means with the second means spaced from said valve seat, said first check valve and said nipple check valve both being permitted to move to closed position with the cam member in low cam position.

* * * * *

PO-1050
(5/69)

UNITED STATES PATENT OFFICE
CERTIFICATE OF CORRECTION

Patent No. 3,680,591          Dated August 1, 1972

Inventor(s) Albam M. Vik

It is certified that error appears in the above-identified patent and that said Letters Patent are hereby corrected as shown below:

Column 3, line 26 "O-ring" should be--"O" ring--.
Column 4, line 12 "O-" should be--"O"--. Column 5, line 1 "O-rings" should be--"O" rings--. Column 8, line 56 "passage way" should be--passageway--; Column 8, line 59 "O-ring" should be-- "O" ring--. Column 15, line 18 (Claim 17, line 14) "passed" should be--past--; Column 15, line 38 (Claim 18, Line 5) after "seat" insert a comma --,--; Column 15, line 42 (Claim 18, line 8) "one" should be--a--.

Signed and sealed this 6th day of March 1973.

(SEAL)
Attest:

EDWARD M. FLETCHER, JR.          ROBERT GOTTSCHALK
Attesting Officer                Commissioner of Patents